(12) United States Patent
Fossum

(10) Patent No.: US 7,130,156 B1
(45) Date of Patent: Oct. 31, 2006

(54) SUSPENSION BASE PLATE WITH BOSS TOWER HAVING TAPERED SWAGE BALL-ENGAGING SURFACE

(75) Inventor: Randolph Edward Fossum, Richfield, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 997 days.

(21) Appl. No.: 10/041,945

(22) Filed: Jan. 7, 2002

Related U.S. Application Data

(60) Provisional application No. 60/260,343, filed on Jan. 8, 2001.

(51) Int. Cl.
*G11B 5/55* (2006.01)

(52) U.S. Cl. .................................................. 360/244.6

(58) Field of Classification Search ............. 360/244.5, 360/244.6
See application file for complete search history.

(56) References Cited

U.S. PATENT DOCUMENTS

| | | | | |
|---|---|---|---|---|
| 5,602,698 | A | * 2/1997 | Miyazaki et al. | ........ 360/244.6 |
| 5,717,545 | A | * 2/1998 | Brooks et al. | ........... 360/244.6 |
| 6,033,755 | A | 3/2000 | Hanrahan et al. | |

* cited by examiner

*Primary Examiner*—A. J. Heinz
(74) *Attorney, Agent, or Firm*—Faegre & Benson LLP

(57) ABSTRACT

A base plate adapted to attach a head suspension assembly to an actuator arm. The base plate includes a flange portion with a boss tower perpendicular to a plane of the flange portion. The boss tower includes a swaging hole with a tapered portion that increases in diameter in a direction away from the flange portion.

31 Claims, 4 Drawing Sheets

SUSPENSION BASE PLATE WITH BOSS TOWER HAVING TAPERED SWAGE BALL-ENGAGING SURFACE

This application claims the benefit of U.S. Provisional Application Ser. No. 60/260,343 filed Jan. 8, 2001.

FIELD OF THE INVENTION

The present invention is directed to base plate with a tapered inside diameter swaging hole and to a method for swaging a base plate to an actuator arm.

BACKGROUND OF THE INVENTION

In a dynamic rigid disk storage device, a rotating disk is employed to store information. Rigid disk storage devices typically include a frame to provide attachment points and orientation for other components, and a spindle motor mounted to the frame for rotating the disk. A read/write head is formed on a "head slider" for writing and reading data to and from the disk surface. The head slider is supported and properly oriented in relationship to the disk by a head suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the head suspension, thus positioning the head slider at a desired height and alignment above the disk that is referred to as the "fly height."

Head suspensions for rigid disk drives include a load beam and a flexure. The load beam includes a mounting region at its proximal end for mounting the head suspension to an actuator of the disk drive, a rigid region, and a spring region between the mounting region and the rigid region for providing a spring force to counteract the aerodynamic lift force generated on the head slider during the drive operation as described above. The flexure typically includes a gimbal region having a slider-mounting surface where the head slider is mounted. The gimbal region is resiliently moveable with respect to the remainder of the flexure in response to the aerodynamic forces generated by the air bearing. The gimbal region permits the head slider to move in pitch and roll directions and to follow disk surface fluctuations.

In one type of head suspension, the flexure is formed as a separate piece having a load beam-mounting region that is rigidly mounted to the distal end of the load beam using conventional methods such as spot welds. Head suspensions of this type typically include a load point dimple formed in either the load beam or the gimbal region of the flexure. The load point dimple transfers portions of the load generated by the spring region of the load beam to the flexure, provides clearance between the flexure and the load beam, and serves as a point about which the head slider can gimbal in pitch and roll directions to follow fluctuations in the disk surface.

The actuator arm is coupled to an electromechanical actuator that operates within a negative feedback, closed-loop servo system. The actuator moves the data head or head slider radially over the disk surface for track seek operations and holds the transducer or read/write head directly over a track on the disk surface for track following operations.

The preferred method of attaching the head suspension to the actuator arm is swaging because of the speed and cleanliness of the swaging process. Swaging also provides a strong joint that resists microslip. The swaging process has been in use in rigid disk drives since the late 1960s for attaching head-suspension assemblies to actuator arms.

The design of the swage joint has been reduced in size to keep up with the miniaturization of disk drives. However, recent moves to disk-to-disk spacings of under two millimeters have presented a severe problem. Miniaturization of the swage plates is not satisfactory because the torque-out capability that the swaged system drops too low to be useful.

U.S. Pat. No. 5,717,545 (Brooks, et al.) discloses a swage boss design using axially extending lobes or flutes formed in the outer peripheral surface of the boss to increase torque-out resistance without increasing the pry-out force necessary to remove the head-suspension assembly from the actuator arm.

U.S. Pat. No. 6,003,755 (Hanrahan, et al.) teaches a base plate geometry with a swaging hole that is tapered so that the minimum diameter is located farther away from the flange than the maximum diameter. The tapered swaging hole provides that in tension, the swage force and plastic strain build up slowly so that there exists a strain hardened area between the contact zone and the flange by the time the swaging ball really begins to work, thus isolating the flange region and the lower region of the hub. In compression, the ball immediately builds plastic strain energy while the ball is far away from the flange and by the time the ball gets near the flange the barrel diameter has enlarged creating a less intense plastic flow thus reducing the plastic strain near the critical flange area.

What is needed is an innovative way to increase the torque-out capabilities of swaged connections.

BRIEF SUMMARY OF THE INVENTION

The present invention is directed to a base plate adapted to attach a head suspension assembly to an actuator arm. The base plate comprises a flange portion with a boss tower perpendicular to a plane of the flange portion. The boss tower comprises a swaging hole with a tapered portion that increases in diameter in a direction away from the flange portion.

The swaging hole optionally includes a chamfered portion adjacent to the flange portion. The swaging hole can be symmetrical or asymmetrical. The tapered portion comprises an angle of about 5 degrees to about 15 degrees.

The present invention is also directed to a base plate with a boss tower having a swaging hole with a tapered surface. The tapered surface comprises a minimum diameter and a maximum diameter further from the flange than the minimum diameter.

The present invention is also directed to a head stack assembly in a rigid disk drive. The head stack assembly includes an actuator arm and a head suspension assembly. A base plate is provided that is adapted to attach the head suspension assembly to the actuator arm. The base plate comprises a flange portion with a boss tower perpendicular to a plane of the flange portion. The boss tower has a swaging hole with a tapered surface. The tapered surface comprises a minimum diameter and a maximum diameter further from the flange than the minimum diameter.

The present invention is also directed to a method of swaging a head suspension to an actuator arm in a rigid disk drive. The method includes providing a head suspension assembly comprising a load beam having a mounting region, a rigid region and a spring region located between the mounting region and rigid region. An aperture in the mounting region is positioned concentrically with an aperture in the actuator arm. A base plate is provided with a boss tower having a swaging hole with a tapered surface. The tapered surface comprises a minimum diameter and a maximum diameter further from the flange than the minimum diameter. The boss tower is inserted into the apertures of the mounting region and the actuator arm so that the mounting region is positioned between the actuator arm and a flange portion. A first swaging ball is inserted into the swaging hole. The first swaging ball has a diameter greater than the minimum diameter. In one embodiment, a second swaging ball is inserted into the swaging hole. The second swaging ball has a diameter greater than the minimum diameter but less than the maximum diameter.

DETAILED DESCRIPTION OF THE INVENTION

Figure 1:
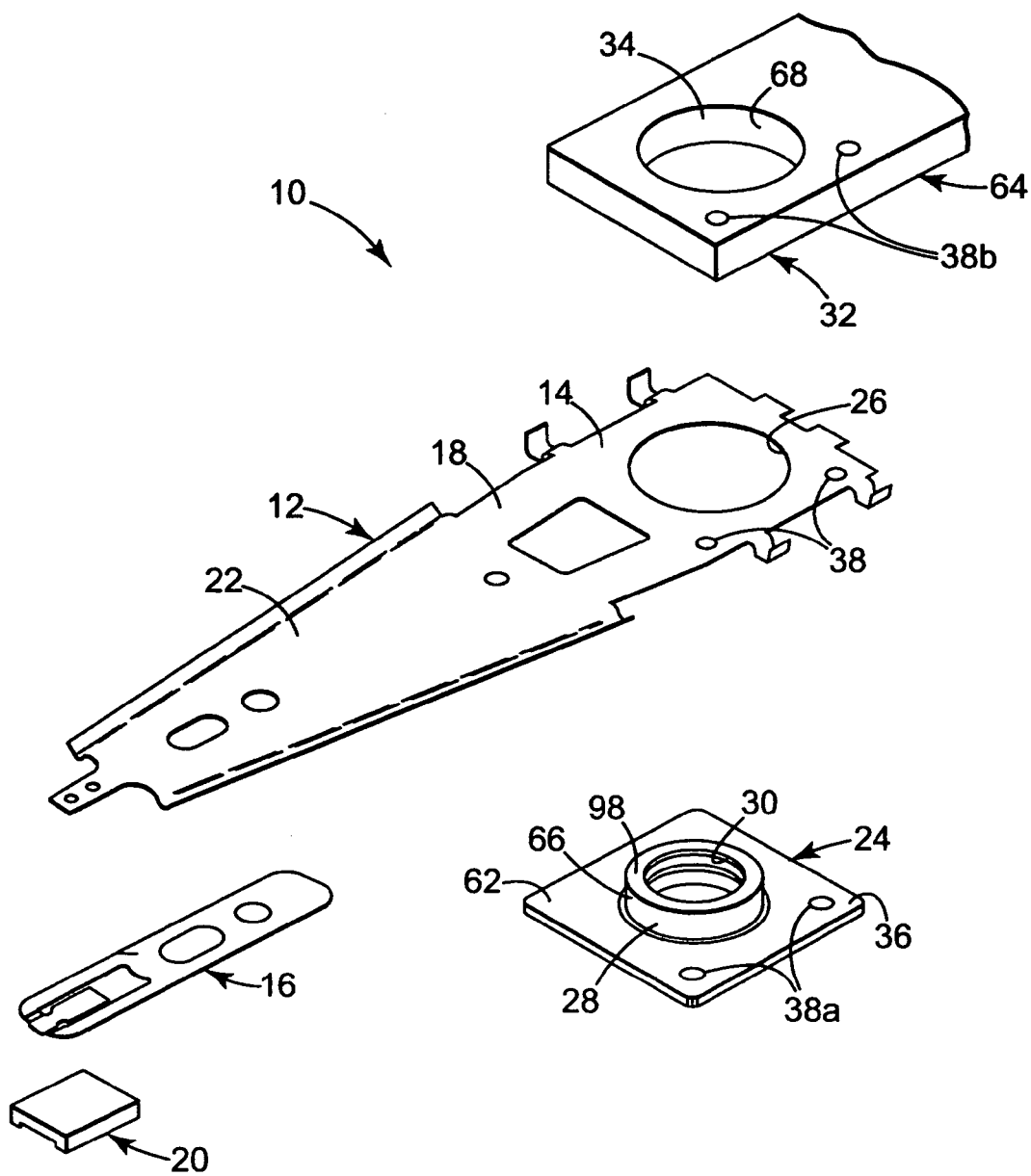
FIG. 1 is a perspective view of head suspension assembly in accordance with the present invention.

FIG. 1 is an exploded, isometric view of a head stack assembly 10 including a load beam 12, an actuator arm 32 and a base plate 24 with a tapered swaging hole 30 in accordance with the present invention. As used herein, "tapered" refers to a portion of a hole having a gradually decreasing diameter. The tapered swaging hole 30 may have a shape generally corresponding to a cone. Alternatively, the tapered swaging hole 30 may be asymmetrical.

The head suspension assembly 10 includes a load beam 12 with a flexure 16 to which a head slider 20 having a read/write element or head is to be mounted. The load beam 12 includes a mounting region 14 at a proximal end, a rigid region 22 adjacent to a distal end and a spring region 18 between the mounting region and rigid region. Spring region 18 is relatively resilient and provides a downward bias force at the distal tip of load beam 12 for holding the read/write head near a spinning disk in opposition to an upward force created by an air bearing over the disk. The flexure 16 is to allow pitch and roll motion of head slider 20 and read/write head as they move over the data tracks of the disk. The head suspension assembly 10 is typically coupled to the actuator via the actuator arm 32 that is attached to the mounting region 14 of load beam 12.

A swage type attachment is used to couple the mounting region of a load beam to an actuator arm. To swage load beam 12 to actuator arm 32, actuator arm 32 and mounting region 14 include apertures 34 and 26, respectively. A base plate 24 having a boss tower 28 with a swage hole 30 extending therethrough and, typically, a square flange 36 is welded or otherwise attached to a bottom face of mounting region 14 of load beam 12. Boss tower 28 is then inserted through actuator arm aperture 34. One or more swage balls 60 (see FIG. 2) are then forced through swage hole 30 in boss tower 28 causing boss tower 28 to expand in actuator arm aperture 34. This expansion creates a frictional attachment interface between outside surface 66 of boss tower 28 and interior surface 68 of actuator arm aperture 34.

The aperture 26 is a processing hole that can optionally be used to align the head suspension assembly 10 with boss tower 28. In addition to aperture 26, the load beam 12 typically includes one or more processing holes 38 useful for aligning the load beam 12 with the base plate 24 and/or actuator arm 32. The base plate 24 and/or actuator arm 32 may optionally include corresponding processing holes 38a, 38b to facilitate alignment.

Figure 2:
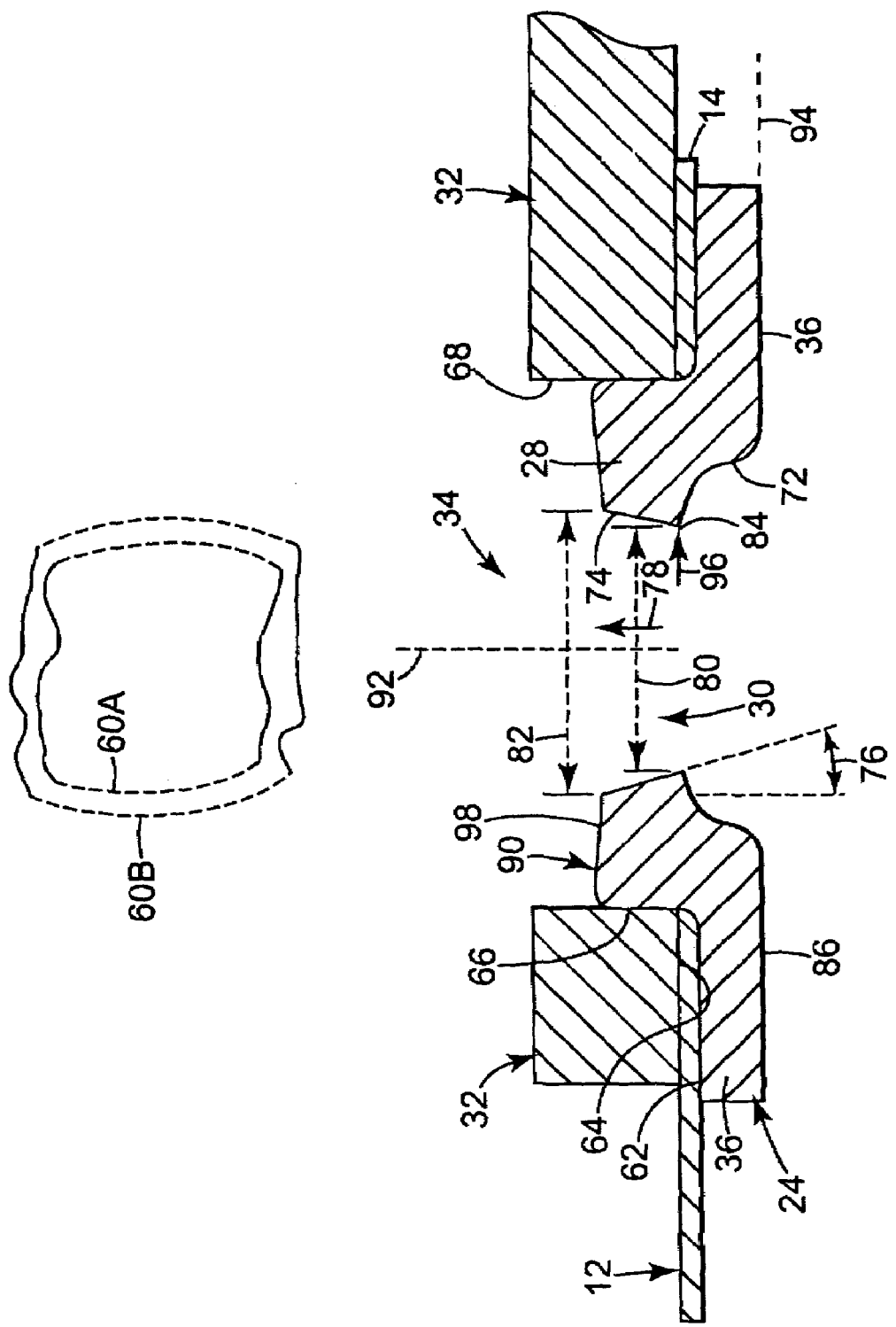
FIG. 2 is a side sectional view of the base plate prior to swaging with the actuator arm in accordance with the present invention.
Figure 2A:
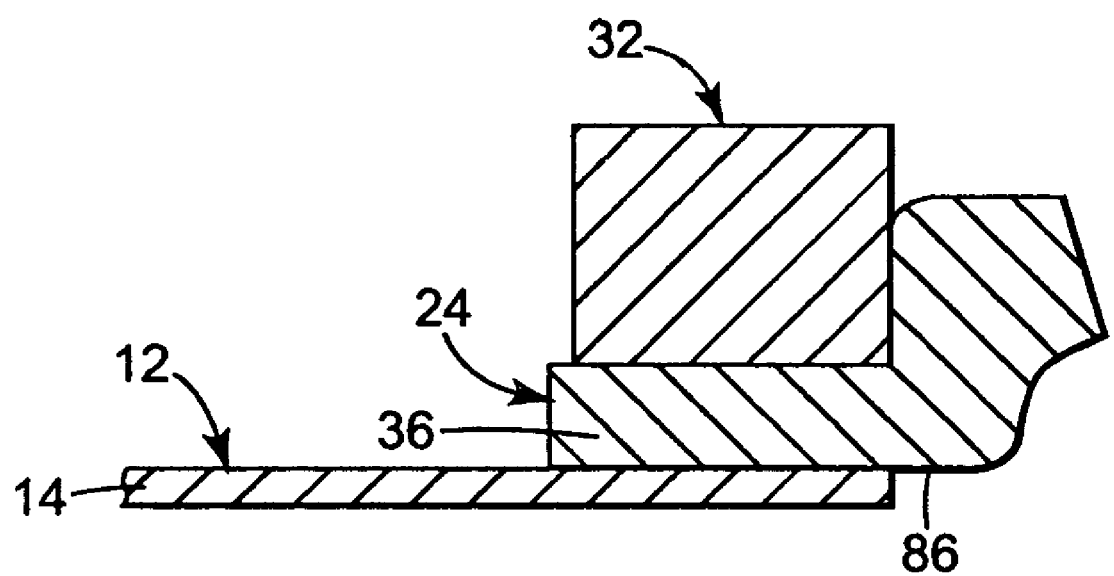
FIG. 2a is a further embodiment of a side sectional view of the base plate prior to swaging with the actuator arm in accordance with the present invention.

FIG. 2 is a cross-sectional view of the base plate 24 positioned to retain the mounting region 14 of the head suspension assembly 10 to the actuator arm 32. As shown in FIG. 2, the mounting region 14 is sandwiched between first surface 62 of the flange 36 and surface 64 on the actuator arm 32. Outside surface 66 of the boss tower 28 is sized to fit in the aperture 34 in the actuator arm 32. The outside surface 66 is typically adjacent to the aperture surface 68, although the amount of engagement before swaging may vary. Alternatively, as shown in FIG. 2a, the mounting region 14 may be welded to a second surface 86 of the flange 36.

Swaging hole 30 includes a tapered surface 74 and a chamfered portion 72. The tapered surface expands in a direction 78 away from the flange 36. In other words, minimum diameter 80 is closer to the flange 36 than maximum diameter 82. Angle 76 of the tapered surface 74 is typically between about 5 degrees and about 15 degrees, although in some embodiments the angle 76 is less than 5 degrees or greater than 15 degrees. The tapered surface 74 reaches a minimum diameter along a ring at location 84. In one embodiment, the location 84 comprises a cylindrical surface. Chamfer 72 continues from the location 84 to the second surface 86 of the flange 36.

In operation, the location 84 is typically between top surface 98 of the boss tower 28 and the second surface 64 of the actuator arm 32. In another embodiment, the minimum diameter 80 is coplanar with surface 64 on the actuator arm 32. In yet another embodiment, the minimum diameter 80 is coplanar with first surface 62 on the flange 36. The tapered surface 74 can be symmetrical or asymmetrical with respect to a centerline 92 that is perpendicular to a plane 94 of the flange 36. Asymmetry can be intentional or the result of manufacturing variation.

Swaging ball 60A typically engages the boss tower 28 at the location 84, generating force 96. If the swaging hole 30 and the swaging ball 60 are symmetrical, the force 96 will radiate concentrically outward at the location 84. By focusing the initial swaging force 96 at location 84, the entire boss tower 28 is forced outward. Subsequent swaging ball 60B of greater diameter can then be used to expand the top half 90 of the base plate 24, primarily in the region of the boss tower 28 above the location 84. The resultant swaged connection has a greater contact surface area between the outside surface 66 of the boss tower 28 and the aperture surface 68 of the aperture 34.

Figure 3:
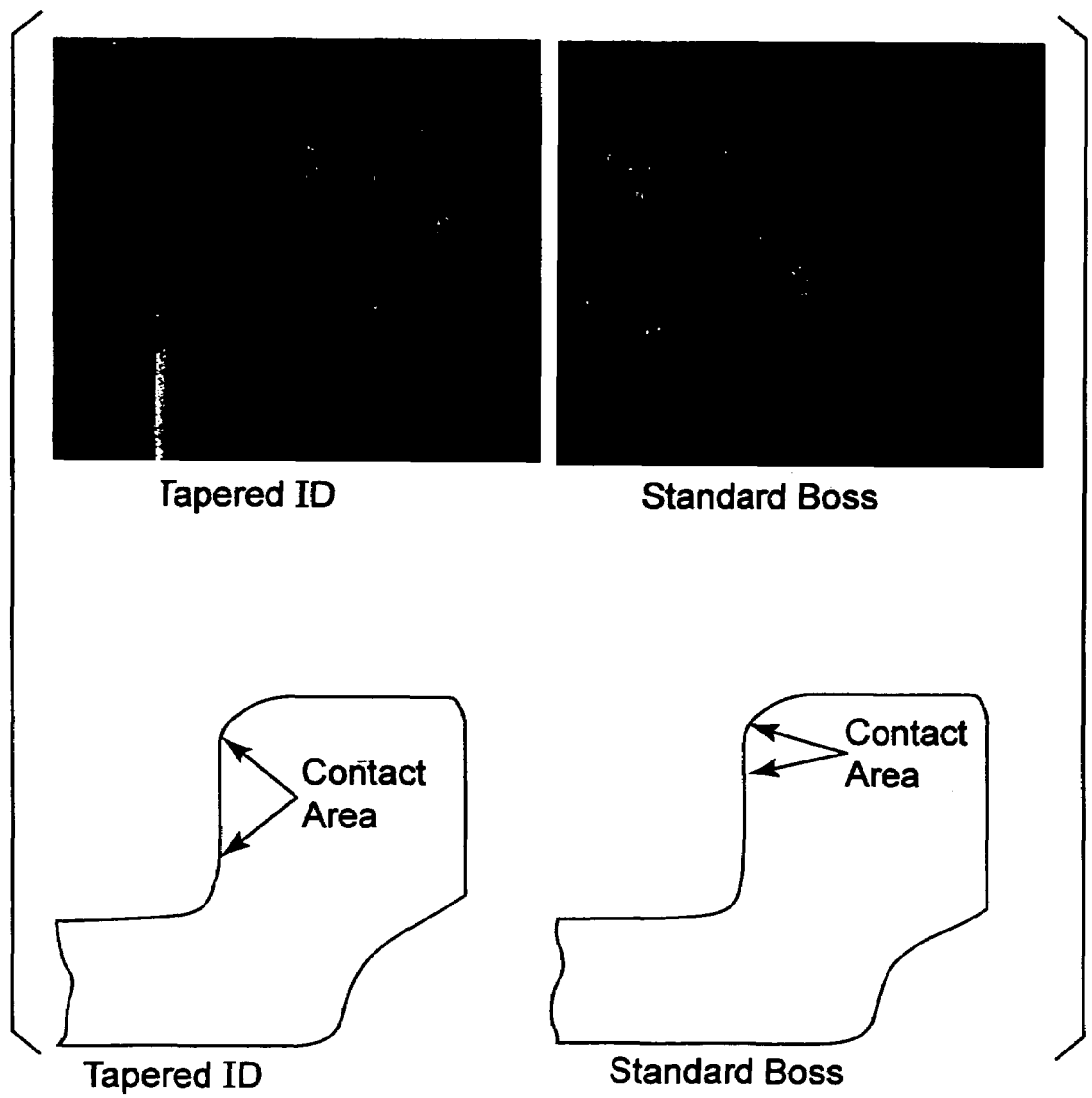
FIG. 3 includes cross-sectional photographs and side sectional view for a pair of swaged base plates.

As demonstrated in the test data in Table 1 below and in photographs in FIG. 3, the present approach increases the surface area of the interface between outside surface of boss tower and interior surface of actuator arm aperture. The torque retention is increased by about 23%. The initial results and replication results were generated on an annealed base plate with a taper formed using a simple fixture. The in-die test results were generated using a production base plate formed using a modified die. The tapered base plates were stamped along with a control group, assembled into suspensions and swage tested.

TABLE 1

| | Fixture Testing | | | | | | | |
|---|---|---|---|---|---|---|---|---|
| | Gram Change | | | | Torque Retention (oz-in) | | | |
| | Tension | | Compression | | Tension | | Compression | |
| | AVG | STD | AVG | STD | AVG | STD | AVG | STD |
| | Initial Test Results | | | | | | | |
| Control | −0.048 | 0.06 | −0.387 | 0.05 | 6.29 | 1.69 | 6.12 | 1.26 |
| Tapered ID | −0.028 | 0.048 | −0.347 | 0.11 | 10.44 | 1.71 | 7.67 | 1.69 |
| % Charge | −41.67% | | +10.34% | | 25.93% | | 25.33% | |
| | Replication Results | | | | | | | |
| Control | −0.105 | 0.065 | −0.373 | 0.059 | 8.01 | 1.08 | 5.89 | 0.8 |
| Tapered ID | −0.059 | 0.046 | −0.291 | 0.073 | 9.73 | 1.29 | 6.71 | 1.16 |
| % Charge | −43.81% | | −21.96% | | 21.47% | | 13.92% | |
| | In-Die Testing | | | | | | | |
| Control | −0.134 | 0.066 | −0.465 | 0.117 | 5.22 | 0.93 | 4.01 | 0.67 |
| Tapered ID | 0.019 | 0.038 | −0.38 | 0.11 | 6.43 | 0.87 | 5.14 | 1.08 |
| % Charge | −85.9% | | −18.3% | | 23.1% | | 28.2% | |

All patents and patent applications disclosed herein, including those disclosed in the background of the invention, are hereby incorporated by reference. Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A base plate adapted to attach a head suspension assembly to an actuator arm, the base plate comprising a flange portion with a boss tower extending from the flange portion, the boss tower comprising a swaging hole with a tapered swaging tool-engaging inner surface that increases in diameter in a direction away from the flange portion.

2. The base plate of claim 1 wherein the swaging hole includes a chamfered portion adjacent to the flange portion.

3. The base plate of claim 1 wherein the swaging hole extends through a thickness of the base plate.

4. The base plate of claim 1 wherein the swaging hole has a centerline.

5. The base plate of claim 4 wherein the swaging hole is symmetrical with respect to the centerline.

6. The base plate of claim 4 wherein the swaging hole is asymmetrical with respect to the centerline.

7. The base plate of claim 1 wherein the tapered surface of the swaging hole has an angle of between about 5 degrees and about 15 degrees.

8. The base plate of claim 1 wherein the flange portion comprises at least one processing hole for aligning the base plate with respect to the head suspension assembly and the actuator arm.

9. A base plate adapted to attach a head suspension assembly to an actuator arm, the base plate comprising a flange portion with a boss tower extending from the flange portion, the boss tower having a swaging hole with a tapered swaging tool-engaging inner surface, the tapered surface having a minimum diameter and a maximum diameter located further from the flange portion than the minimum diameter.

10. The base plate of claim 9 wherein the swaging hole includes a chamfered portion adjacent to the flange portion.

11. The base plate of the claim 10 wherein the tapered surface reaches the minimum diameter at the chamfered portion to form a ring portion in the swaging hole.

12. The base plate of claim 11 wherein the ring portion comprises a cylindrical surface.

13. The base plate of claim 9 wherein the flange portion comprises at least one processing hole for aligning the base plate with respect to the head suspension assembly and the actuator arm.

14. The base plate of claim 9 wherein the swaging hole has a centerline.

15. The base plate of claim 14 wherein the swaging hole is symmetrical with respect to the centerline.

16. The base plate of claim 14 wherein the swaging hole is asymmetrical with respect to the centerline.

17. The base plate of claim 9 wherein the swaging hole extends through a thickness of the base plate.

18. The base plate of claim 9 wherein the tapered surface of the swaging hole has an angle of between about 5 degrees and about 15 degrees.

19. A head stack assembly in a rigid disk drive comprising:
   an actuator arm;
   a head suspension assembly comprising a load beam having a mounting region, a rigid region, and a spring region located between the mounting region and rigid region; and
   a base plate adapted to attach the head suspension assembly to the actuator arm, the base plate comprising a flange portion having a boss tower located on a first surface of the flange portion and extending from the flange portion, the boss tower having an outside surface and a swaging hole with a tapered swaging tool-engaging inner surface, the tapered surface comprising a minimum diameter and a maximum diameter located further from the flange than the minimum diameter.

20. The head stack assembly of claim 19 wherein the swaging hole extends through a thickness of the base plate.

21. The head stack assembly of claim 19 wherein the mounting region of the load beam is sandwiched between the first surface of the flange portion and an adjacent surface of the actuator arm, and the outside surface of the boss tower is received in an aperture in the actuator arm and an aperture in the load beam of the head suspension assembly.

22. The head stack assembly of claim 21 wherein the outside surface of the boss tower is adjacent to a surface of the aperture in the actuator arm and a surface of the aperture in the load beam.

23. The head stack assembly of claim 21 wherein the swaging hole of the base plate includes a chamfered portion adjacent to the flange portion.

24. The head stack assembly of claim 23 wherein the tapered surface reaches the minimum diameter at the chamfered portion to form a ring portion in the swaging hole.

25. The head stack assembly of claim 24 wherein the ring portion comprises a cylindrical surface.

26. The head stack assembly of claim 24 wherein the boss tower has a top surface and the ring portion is located between the top surface of the boss tower and the adjacent surface of the actuator arm.

27. The head stack assembly of claim 24 wherein the minimum diameter of the base plate is coplanar with the adjacent surface of the actuator arm.

28. The head stack assembly of claim 24 wherein the minimum diameter of the base plate is coplanar with the first surface of the flange portion.

29. The head stack assembly of claim 19 wherein the flange portion has a second surface on a side of the base plate opposite the boss tower and the mounting region of the load beam is welded to the flange portion on the second surface.

30. A method of swaging a head suspension to an actuator arm in a rigid disk drive, comprising the steps of:
    providing a head suspension assembly comprising a load beam having a mounting region, a rigid region, and a spring region located between the mounting region and rigid region;
    positioning an aperture in the mounting region concentric with an aperture in the actuator arm;
    providing a base plate comprising a flange portion with a boss tower extending from the flange portion, the boss tower having a swaging hole with a tapered swaging tool-engaging inner surface, the tapered surface comprising a minimum diameter and a maximum diameter further from the flange portion than the minimum diameter;
    inserting the boss tower into the apertures of the mounting region and the actuator arm so that the mounting region is positioned between the actuator arm and the flange portion of the base plate; and
    inserting a first swaging ball into the swaging hole, the first swaging ball having a diameter greater than the minimum diameter but less than the maximum diameter.

31. The method of claim 30 comprising the step of inserting a second swaging ball into the swaging hole, the second swaging ball having a diameter greater than the diameter of the first swaging ball.

* * * * *